United States Patent
Oinuma et al.

(10) Patent No.: US 11,209,612 B2
(45) Date of Patent: Dec. 28, 2021

(54) CAMERA OPTICAL LENS

(71) Applicant: AAC Optics Solutions Pte. Ltd., Singapore (SG)

(72) Inventors: Kenji Oinuma, Shenzhen (CN); Lei Zhang, Shenzhen (CN); Yanmei Wang, Shenzhen (CN); Yuanshan Cui, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 294 days.

(21) Appl. No.: 16/677,669

(22) Filed: Nov. 8, 2019

(65) Prior Publication Data
US 2020/0209532 A1  Jul. 2, 2020

(30) Foreign Application Priority Data
Dec. 27, 2018 (CN) .................. 201811614436.4

(51) Int. Cl.
G02B 13/00 (2006.01)
G02B 9/62 (2006.01)
G02B 27/00 (2006.01)
G02B 5/00 (2006.01)
G02B 13/18 (2006.01)

(52) U.S. Cl.
CPC .......... G02B 9/62 (2013.01); G02B 13/0045 (2013.01); G02B 27/005 (2013.01); G02B 5/005 (2013.01); G02B 13/18 (2013.01)

(58) Field of Classification Search
CPC ...... G02B 13/0045; G02B 9/62; G02B 13/18; G02B 5/005; G02B 27/005

USPC ................. 359/713, 739, 740, 759
See application file for complete search history.

(56) References Cited

U.S. PATENT DOCUMENTS

| | | | | |
|---|---|---|---|---|
| 8,908,290 B1 * | 12/2014 | Liao | .................. | G02B 13/0045 359/715 |
| 9,195,030 B2 * | 11/2015 | Liao | .................. | G02B 13/0045 |
| 9,753,256 B2 * | 9/2017 | Asami | ................ | G02B 27/0025 |
| 2013/0279021 A1 * | 10/2013 | Chen | ...................... | G02B 5/005 359/713 |
| 2013/0335833 A1 * | 12/2013 | Liao | ...................... | G02B 13/18 359/713 |
| 2014/0118844 A1 * | 5/2014 | Tsai | ...................... | G02B 13/04 359/713 |
| 2014/0247507 A1 * | 9/2014 | Tsai | ...................... | G02B 13/18 359/713 |
| 2015/0198786 A1 * | 7/2015 | Liao | .................. | G02B 13/0045 359/713 |
| 2015/0241659 A1 * | 8/2015 | Huang | ............... | G02B 13/0045 359/713 |
| 2017/0212333 A1 * | 7/2017 | Huang | ............... | G02B 13/0045 |

* cited by examiner

Primary Examiner — Evelyn A Lester
(74) Attorney, Agent, or Firm — W&G Law Group

(57) ABSTRACT

The present disclosure relates to the field of optical lenses and provides a camera optical lens. The camera optical lens includes, from an object side to an image side: a first lens; a second lens having a positive refractive power; a third lens having a positive refractive power; a fourth lens; a fifth lens; and a sixth lens. The camera optical lens satisfies following conditions: $3.00 \leq f1/f \leq 10.00$; and $-20.00 \leq R3/d3 \leq -5.00$. The camera optical lens can achieve a high performance while obtaining a low TTL.

20 Claims, 9 Drawing Sheets

CAMERA OPTICAL LENS

TECHNICAL FIELD

The present disclosure relates to the field of optical lens, and more particularly, to a camera optical lens suitable for handheld terminal devices, such as smart phones or digital cameras, and imaging devices, such as monitors or PC lenses.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lenses with good imaging quality therefore have become a mainstream in the market. In order to obtain better imaging quality, the lens that is traditionally equipped in mobile phone cameras adopts a three-piece or four-piece lens structure. Also, with the development of technology and the increase of the diverse demands of users, and as the pixel area of photosensitive devices is becoming smaller and smaller and the requirement of the system on the imaging quality is improving constantly, the five-piece, six-piece and seven-piece lens structures gradually appear in lens designs. There is an urgent need for ultra-thin, wide-angle camera lenses with good optical characteristics and fully corrected chromatic aberration.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
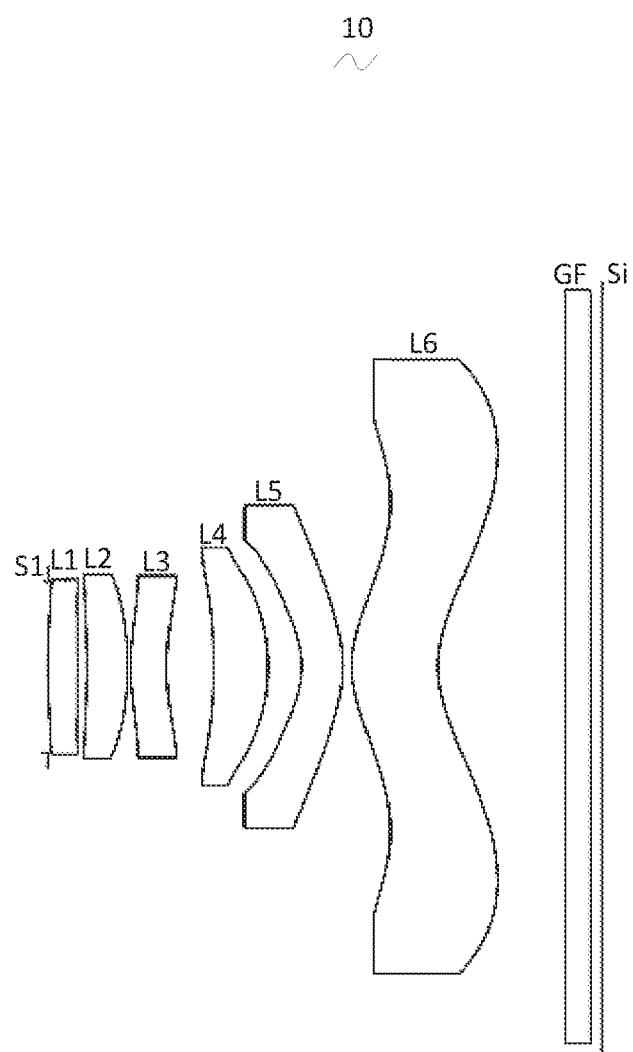
FIG. 1 is a schematic diagram of a structure of a camera optical lens in accordance with Embodiment 1 of the present disclosure.

Referring to FIG. 1, the present disclosure provides a camera optical lens 10. FIG. 1 shows the camera optical lens 10 according to Embodiment 1 of the present disclosure. The camera optical lens 10 includes 6 lenses. Specifically, the camera optical lens 10 includes, from an object side to an image side, an aperture S1, a first lens L1, a second lens L2, a third lens L3, a fourth lens L4, a fifth lens L5, and a sixth lens L6. An optical element such as an optical filter GF can be arranged between the sixth lens L6 and an image plane Si.

The first lens L1 is made of a plastic material, the second lens L2 is made of a plastic material, the third lens L3 is made of a plastic material, the fourth lens L4 is made of a plastic material, the fifth lens L5 is made of a plastic material, and the sixth lens L6 is made of a plastic material.

The second lens L2 has a positive refractive power, and the third lens L3 has a positive refractive power.

Here, a focal length of the camera optical lens 10 is defined as f, and a focal length of the first lens L1 is defined as f1. The camera optical lens 10 should satisfy a condition of $3.00 \le f1/f \le 10.00$, which specifies a ratio of the focal length f1 of the first lens L1 and the focal length f of the camera optical lens 10. If the lower limit of the specified value is exceeded, although it would facilitate development of ultra-thin lenses, the positive refractive power of the first lens L1 will be too strong, and thus it is difficult to correct the problem like an aberration and it is also unfavorable for development of wide-angle lenses. On the contrary, if the upper limit of the specified value is exceeded, the positive refractive power of the first lens L1 would become too weak, and it is then difficult to develop ultra-thin lenses. Preferably, $3.01 \le f1/f \le 9.50$.

A curvature radius of an object side surface of the second lens L2 is defined as R3, and an on-axis thickness of the second lens L2 is defined as d3. The camera optical lens 10 further satisfies a condition of $-20.00 \le R3/d3 \le -5.00$, which specifies a shape of the second lens L2. Out of this range, a development towards ultra-thin and wide-angle lenses would make it difficult to correct the problem like the aberration. Preferably, $-19.95 \le R3/d3 \le -5.25$.

A total optical length from an object side surface of the first lens L1 to an image plane of the camera optical lens 10 along an optic axis is defined as TTL. When the focal length of the camera optical lens, the focal length of the first lens, the curvature radius of the object side surface of the second lens and the on-axis thickness of the second lens satisfy the above conditions, the camera optical lens will have the advantage of high performance and satisfy the design requirement of a low TTL.

In this embodiment, the object side surface of the first lens L1 is convex in a paraxial region, and the first lens L1 has a positive refractive power.

A curvature radius of the object side surface of the first lens L1 is defined as R1, and a curvature radius of an image side surface of the first lens L1 is defined as R2. The camera optical lens 10 further satisfies a condition of $-8.34 \leq (R1+R2)/(R1-R2) \leq -0.59$. This can reasonably control a shape of the first lens L1 in such a manner that the first lens L1 can effectively correct a spherical aberration of the camera optical lens. Preferably, $-5.21 \leq (R1+R2)/(R1-R2) \leq -0.73$.

An on-axis thickness of the first lens L1 is defined as d1. The camera optical lens 10 further satisfies a condition of $0.02 \leq d1/TTL \leq 0.08$. This facilitates achieving ultra-thin lenses. Preferably, $0.04 \leq d1/TTL \leq 0.06$.

In this embodiment, an object side surface of the second lens L2 is concave in the paraxial region, an image side surface of the second lens L2 is convex in the paraxial region, and the second lens L2 has a positive refractive power.

The focal length of the camera optical lens 10 is f, and a focal length of the second lens L2 is f2. The camera optical lens 10 further satisfies a condition of $1.35 \leq f2/f \leq 4.94$. By controlling the positive refractive power of the second lens L2 within the reasonable range, correction of the aberration of the optical system can be facilitated. Preferably, $2.16 \leq f2/f \leq 3.95$.

A curvature radius of the object side surface of the second lens L2 is defined as R3, and a curvature radius of the image side surface of the second lens L2 is defined as R4. The camera optical lens 10 further satisfies a condition of $1.35 \leq (R3+R4)/(R3-R4) \leq 6.90$. This can reasonably control a shape of the second lens L2. Out of this range, a development towards ultra-thin and wide-angle lenses would make it difficult to correct the problem of the aberration. Preferably, $2.16 \leq (R3+R4)/(R3-R4) \leq 5.52$.

An on-axis thickness of the second lens L2 is defined as d3. The camera optical lens 10 further satisfies a condition of $0.04 \leq d3/TTL \leq 0.16$. This facilitates achieving ultra-thin lenses. Preferably, $0.06 \leq d3/TTL \leq 0.13$.

In this embodiment, an object side surface of the third lens L3 is convex in the paraxial region, an image side surface of the third lens L3 is concave in the paraxial region, and the third lens L3 has a positive refractive power.

The focal length of the camera optical lens 10 is f, and a focal length of the third lens L3 is f3. The camera optical lens 10 further satisfies a condition of $2.98 \leq f3/f \leq 146.81$.

The appropriate distribution of the refractive power leads to a better imaging quality and a lower sensitivity. Preferably, $4.76 \leq f3/f \leq 117.45$.

A curvature radius of the object side surface of the third lens L3 is defined as R5, and a curvature radius of the image side surface of the third lens L3 is defined as R6. The camera optical lens 10 further satisfies a condition of $-97.46 \leq (R5+R6)/(R5-R6) \leq 75.48$, which specifies a shape of the third lens L3. Out of this range, a development towards ultra-thin and wide-angle lenses would make it difficult to correct the problem like an off-axis aberration. Preferably, $-60.91 \leq (R5+R6)/(R5-R6) \leq 60.39$.

An on-axis thickness of the third lens L3 is defined as d5. The camera optical lens 10 further satisfies a condition of $0.03 \leq d5/TTL \leq 0.10$. This facilitates achieving ultra-thin lenses. Preferably, $0.05 \leq d5/TTL \leq 0.08$.

In this embodiment, an object side surface of the fourth lens L4 is concave in the paraxial region, an image side surface of the fourth lens L4 is convex in the paraxial region, and the fourth lens L4 has a positive refractive power.

The focal length of the camera optical lens 10 is f, and a focal length of the fourth lens L4 is f4. The camera optical lens 10 further satisfies a condition of $0.63 \leq f4/f \leq 2.16$. The appropriate distribution of the refractive power leads to a better imaging quality and a lower sensitivity. Preferably, $1.00 \leq f4/f \leq 1.73$.

A curvature radius of the object side surface of the fourth lens L4 is defined as R7, and a curvature radius of the image side surface of the fourth lens L4 is defined as R8. The camera optical lens 10 further satisfies a condition of $0.72 \leq (R7+R8)/(R7-R8) \leq 2.88$, which specifies a shape of the fourth lens L4. Out of this range, a development towards ultra-thin and wide-angle lenses would make it difficult to correct the problem like an off-axis aberration. Preferably, $1.16 \leq (R7+R8)/(R7-R8) \leq 2.30$.

An on-axis thickness of the fourth lens L4 is defined as d7. The camera optical lens 10 further satisfies a condition of $0.05 \leq d7/TTL \leq 0.16$. This facilitates achieving ultra-thin lenses. Preferably, $0.08 \leq d7/TTL \leq 0.13$.

In this embodiment, an object side surface of the fifth lens L5 is concave in the paraxial region, an image side surface of the fifth lens L5 is convex in the paraxial region, and the fifth lens L5 has a negative refractive power.

The focal length of the camera optical lens 10 is f, and a focal length of the fifth lens L5 is f5. The camera optical lens 10 further satisfies a condition of $-2.51 \leq f5/f \leq -0.75$. This can effectively make a light angle of the camera lens gentle and reduce the tolerance sensitivity. Preferably, $-1.57 \leq f5/f \leq -0.94$.

A curvature radius of the object side surface of the fifth lens L5 is defined as R9, and a curvature radius of the image side surface of the fifth lens L5 is defined as R10. The camera optical lens 10 further satisfies a condition of $-7.95 \leq (R9+R10)/(R9-R10) \leq -2.23$, which specifies a shape of the fifth lens L5. Out of this range, a development towards ultra-thin and wide-angle lenses would make it difficult to correct the problem like an off-axis aberration. Preferably, $-4.97 \leq (R9+R10)/(R9-R10) \leq -2.79$.

An on-axis thickness of the fifth lens L5 is defined as d9. The camera optical lens 10 further satisfies a condition of $0.03 \leq d9/TTL \leq 0.13$. This facilitates achieving ultra-thin lenses. Preferably, $0.05 \leq d9/TTL \leq 0.10$.

In this embodiment, an object side surface of the sixth lens L6 is convex in the paraxial region, an image side surface of the sixth lens L6 is concave in the paraxial region, and the sixth lens L6 has a positive refractive power.

The focal length of the camera optical lens 10 is f, and a focal length of the sixth lens L6 is f6. The camera optical lens 10 further satisfies a condition of $0.84 \leq f6/f \leq 2.84$. The appropriate distribution of the refractive power leads to a better imaging quality and a lower sensitivity. Preferably, $1.35 \leq f6/f \leq 2.27$.

A curvature radius of the object side surface of the sixth lens L6 is defined as R11, and a curvature radius of the image side surface of the sixth lens L6 is defined as R12. The camera optical lens 10 further satisfies a condition of $-47.90 \leq (R11+R12)/(R11-R12) \leq -10.02$, which specifies a shape of the sixth lens L6. Out of this range, a development towards ultra-thin and wide-angle lenses would make it difficult to correct the problem like an off-axis aberration. Preferably, $-29.94 \leq (R11+R12)/(R11-R12) \leq -12.52$.

A thickness on-axis of the sixth lens L6 is defined as d11. The camera optical lens 10 further satisfies a condition of 0.06≤d11/TTL≤0.23. This facilitates achieving ultra-thin lenses. Preferably, 0.09≤d11/TTL≤0.19.

In this embodiment, the focal length of the camera optical lens 10 is f, and a combined focal length of the first lens L1 and the second lens L2 is f12. The camera optical lens 10 further satisfies a condition of 0.81≤f12/f≤3.24. This can eliminate the aberration and distortion of the camera optical lens while suppressing a back focal length of the camera optical lens, thereby maintaining miniaturization of the camera lens system. Preferably, 1.30≤f12/f≤2.59.

In this embodiment, the total optical length TTL of the camera optical lens 10 is smaller than or equal to 5.34 mm, which is beneficial for achieving ultra-thin lenses. Preferably, the total optical length TTL of the camera optical lens 10 is smaller than or equal to 5.09 mm.

In this embodiment, the camera optical lens 10 has a large F number, which is smaller than or equal to 2.61. The camera optical lens 10 has a better imaging performance. Preferably, the F number of the camera optical lens 10 is smaller than or equal to 2.56.

With such design, the total optical length TTL of the camera optical lens 10 can be made as short as possible, and thus the miniaturization characteristics can be maintained.

In the following, examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

TTL: Optical length (the total optical length from the object side surface of the first lens to the image plane of the camera optical lens along the optic axis) in mm.

Preferably, inflexion points and/or arrest points can be arranged on the object side surface and/or image side surface of the lens, so as to satisfy the demand for the high quality imaging. The description below can be referred to for specific implementations.

The design information of the camera optical lens 10 in Embodiment 1 of the present disclosure is shown in Tables 1 and 2.

TABLE 1

|     | R       | d    |       | nd     |    | vd    |
| --- | ------- | ---- | ----- | ------ | -- | ----- |
| S1  | ∞       | d0 = | 0.000 |        |    |       |
| R1  | 5.398   | d1 = | 0.249 | nd1    | v1 | 55.99 |
|     |         |      |       | 1.5445 |    |       |
| R2  | −85.592 | d2 = | 0.082 |        |    |       |
| R3  | −6.709  | d3 = | 0.337 | nd2    | v2 | 55.99 |
|     |         |      |       | 1.5445 |    |       |
| R4  | −3.082  | d4 = | 0.030 |        |    |       |
| R5  | 2.380   | d5 = | 0.300 | nd3    | v3 | 20.37 |
|     |         |      |       | 1.6613 |    |       |
| R6  | 2.287   | d6 = | 0.396 |        |    |       |
| R7  | −5.407  | d7 = | 0.455 | nd4    | v4 | 56.09 |
|     |         |      |       | 1.5352 |    |       |
| R8  | −1.701  | d8 = | 0.282 |        |    |       |
| R9  | −0.748  | d9 = | 0.343 | nd5    | v5 | 19.24 |
|     |         |      |       | 1.6713 |    |       |
| R10 | −1.256  | d10 =| 0.076 |        |    |       |
| R11 | 0.939   | d11 =| 0.724 | nd6    | v6 | 56.09 |
|     |         |      |       | 1.5352 |    |       |
| R12 | 1.021   | d12 =| 1.067 |        |    |       |
| R13 | ∞       | d13 =| 0.210 | ndg    | vg | 64.17 |
|     |         |      |       | 1.5168 |    |       |
| R14 | ∞       | d14 =| 0.100 |        |    |       |

In the table, meanings of various symbols will be described as follows.

S1: aperture;
R: curvature radius of an optical surface, a central curvature radius for a lens;
R1: curvature radius of the object side surface of the first lens L1;
R2: curvature radius of the image side surface of the first lens L1;
R3: curvature radius of the object side surface of the second lens L2;
R4: curvature radius of the image side surface of the second lens L2;
R5: curvature radius of the object side surface of the third lens L3;
R6: curvature radius of the image side surface of the third lens L3;
R7: curvature radius of the object side surface of the fourth lens L4;
R8: curvature radius of the image side surface of the fourth lens L4;
R9: curvature radius of the object side surface of the fifth lens L5;
R10: curvature radius of the image side surface of the fifth lens L5;
R11: curvature radius of the object side surface of the sixth lens L6;
R12: curvature radius of the image side surface of the sixth lens L6;
R13: curvature radius of an object side surface of the optical filter GF;
R14: curvature radius of an image side surface of the optical filter GF;
d: on-axis thickness of a lens and an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the optical filter GF;
d13: on-axis thickness of the optical filter GF;
d14: on-axis distance from the image side surface of the optical filter GF to the image plane;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
vg: abbe number of the optical filter GF.

Table 2 shows aspherical surface data of the camera optical lens 10 in Embodiment 1 of the present disclosure.

TABLE 2

| | Conic coefficient | Aspherical surface coefficients | | | | | | |
|---|---|---|---|---|---|---|---|---|
| | k | A4 | A6 | A8 | A10 | A12 | A14 | A16 |
| R1 | 0.0000E+00 | −9.3077E−02 | 4.9080E−02 | −1.7365E−02 | −4.9990E−02 | 4.5656E−02 | −1.0329E−03 | 0.0000E+00 |
| R2 | 0.0000E+00 | −5.3381E−02 | 1.2410E−01 | 9.4035E−02 | −1.8738E−01 | 5.9782E−02 | −1.2305E−02 | 0.0000E+00 |
| R3 | 0.0000E+00 | 4.6785E−02 | 9.6606E−03 | −2.8129E−03 | −1.2229E−02 | 0.0000E+00 | 0.0000E+00 | 0.0000E+00 |
| R4 | 0.0000E+00 | −1.0571E−01 | 7.2786E−02 | −3.5759E−01 | 6.3689E−01 | −1.1674E−01 | −7.2896E−01 | 5.6265E−01 |
| R5 | −9.2951E+00 | −8.6469E−02 | −7.7631E−02 | 6.9722E−02 | −2.8625E−01 | 2.0359E−01 | 8.6771E−01 | −1.0864E+00 |
| R6 | −2.7898E+00 | −5.7776E−02 | −1.0827E−01 | 2.2664E−02 | −1.1529E−01 | 3.4022E−01 | −3.6410E−01 | 1.1409E−01 |
| R7 | 0.0000E+00 | −9.9309E−02 | 8.7100E−02 | 1.5457E−02 | −3.9256E−02 | −1.1761E−02 | 4.9754E−02 | 3.7119E−04 |
| R8 | 8.7429E−01 | −6.1045E−02 | 7.0508E−02 | 1.4956E−02 | −1.2000E−02 | −6.2599E−04 | −3.7609E−03 | 2.9684E−02 |
| R9 | −4.7347E+00 | −3.5695E−03 | −1.1224E−02 | −1.5932E−02 | −6.9914E−03 | −3.0483E−03 | 6.8334E−03 | −7.6643E−03 |
| R10 | −4.9576E+00 | 2.7707E−02 | −7.4717E−03 | −1.2328E−03 | −1.4575E−03 | −2.5418E−04 | 2.0998E−04 | 1.5524E−04 |
| R11 | −4.6631E+00 | −5.8865E−02 | 4.0435E−03 | 2.4440E−04 | 1.8033E−05 | 2.6965E−06 | −2.2966E−07 | −1.1720E−07 |
| R12 | −3.5652E+00 | −3.9891E−02 | 5.2165E−03 | −5.3783E−04 | 1.3842E−05 | 8.3354E−07 | −7.4245E−09 | −2.6575E−09 |

Here, K is a conic coefficient, and A4, A6, A8, A10, A12, A14 and A16 are aspheric surface coefficients.

IH: Image Height $$y = (x^2/R)/[1+\{1-(k+1)(x^2/R^2)\}^{1/2}] + A4x^4 + A6x^6 + A8x^8 + A10x^{10} + A12x^{12} + A14x^{14} + A16x^{16} \quad (1)$$

For convenience, an aspheric surface of each lens surface uses the aspheric surfaces shown in the above formula (1). However, the present disclosure is not limited to the aspherical polynomials form shown in the formula (1).

Table 3 and Table 4 show design data of inflexion points and arrest points of respective lens in the camera optical lens 10 according to Embodiment 1 of the present disclosure. P1R1 and P1R2 represent the object side surface and the image side surface of the first lens L1, P2R1 and P2R2 represent the object side surface and the image side surface of the second lens L2, P3R1 and P3R2 represent the object side surface and the image side surface of the third lens L3, P4R1 and P4R2 represent the object side surface and the image side surface of the fourth lens L4, P5R1 and P5R2 represent the object side surface and the image side surface of the fifth lens L5, and P6R1 and P6R2 represent the object side surface and the image side surface of the sixth lens L6. The data in the column named "inflexion point position" refers to vertical distances from inflexion points arranged on each lens surface to the optic axis of the camera optical lens 10. The data in the column named "arrest point position" refers to vertical distances from arrest points arranged on each lens surface to the optic axis of the camera optical lens 10.

TABLE 3

| | Number of inflexion points | Inflexion point position 1 | Inflexion point position 2 |
|---|---|---|---|
| P1R1 | 1 | 0.465 | |
| P1R2 | 1 | 0.415 | |
| P2R1 | 1 | 0.505 | |
| P2R2 | 0 | | |
| P3R1 | 1 | 0.445 | |
| P3R2 | 1 | 0.515 | |
| P4R1 | 1 | 0.765 | |
| P4R2 | 1 | 0.885 | |
| P5R1 | 0 | | |
| P5R2 | 1 | 1.265 | |
| P6R1 | 2 | 0.625 | 1.955 |
| P6R2 | 1 | 0.795 | |

TABLE 4

| | Number of arrest points | Arrest point position 1 |
|---|---|---|
| P1R1 | 0 | |
| P1R2 | 1 | 0.555 |
| P2R1 | 0 | |
| P2R2 | 0 | |
| P3R1 | 1 | 0.745 |
| P3R2 | 0 | |
| P4R1 | 0 | |
| P4R2 | 0 | |
| P5R1 | 0 | |
| P5R2 | 0 | |
| P6R1 | 1 | 1.405 |
| P6R2 | 1 | 1.825 |

Figure 2:
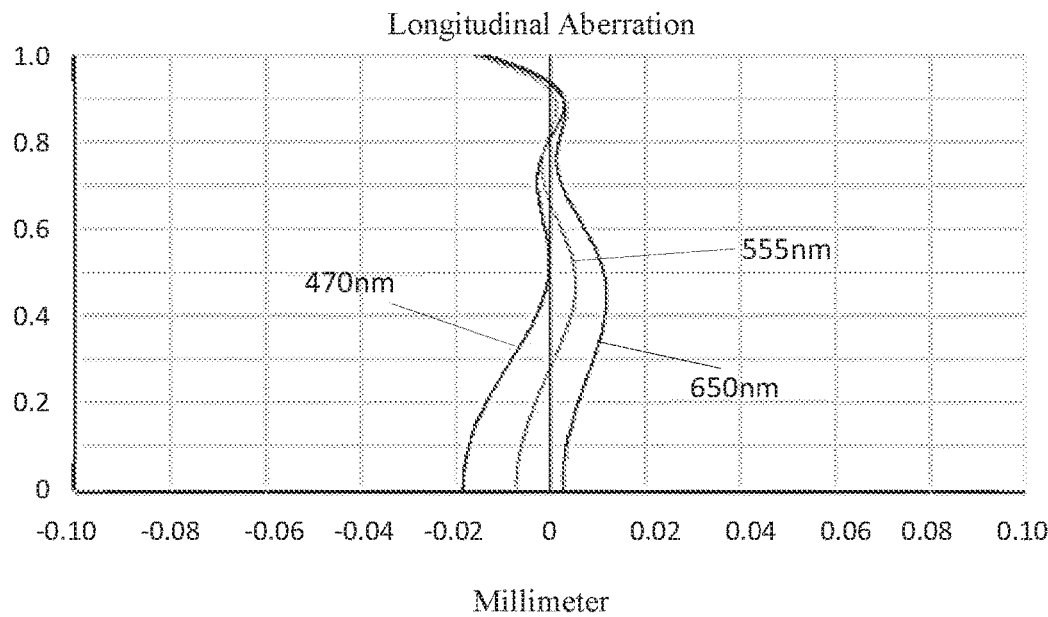
FIG. 2 is a schematic diagram of a longitudinal aberration of the camera optical lens shown in FIG. 1.
Figure 3:
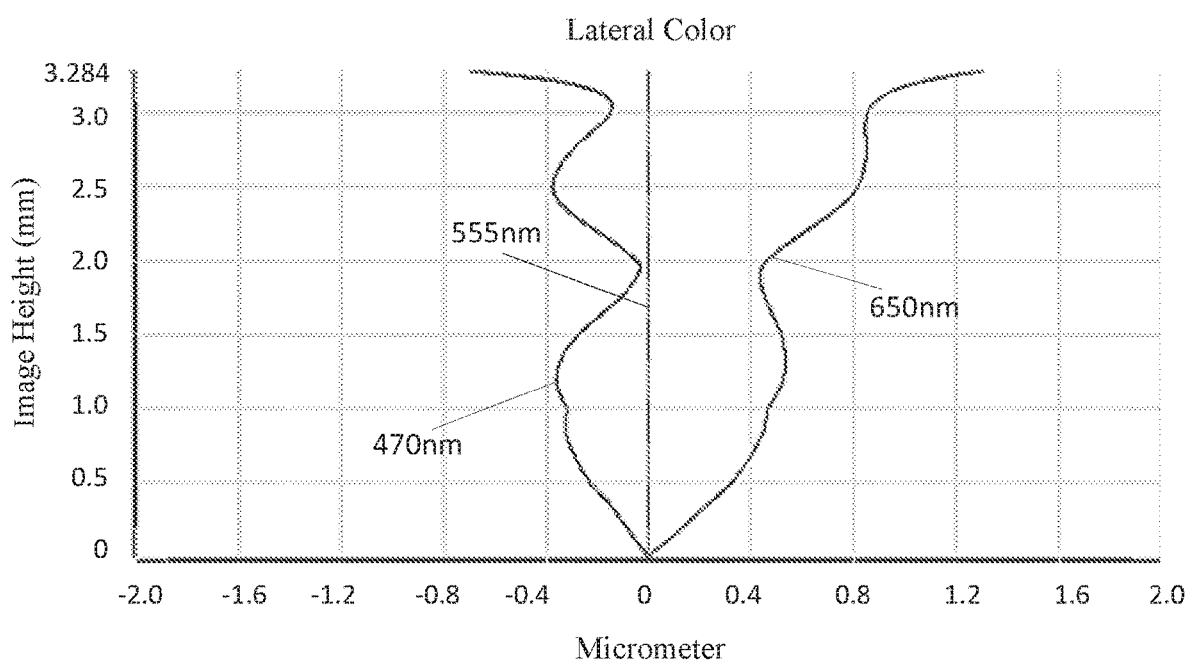
FIG. 3 is a schematic diagram of a lateral color of the camera optical lens shown in FIG. 1.
Figure 4:
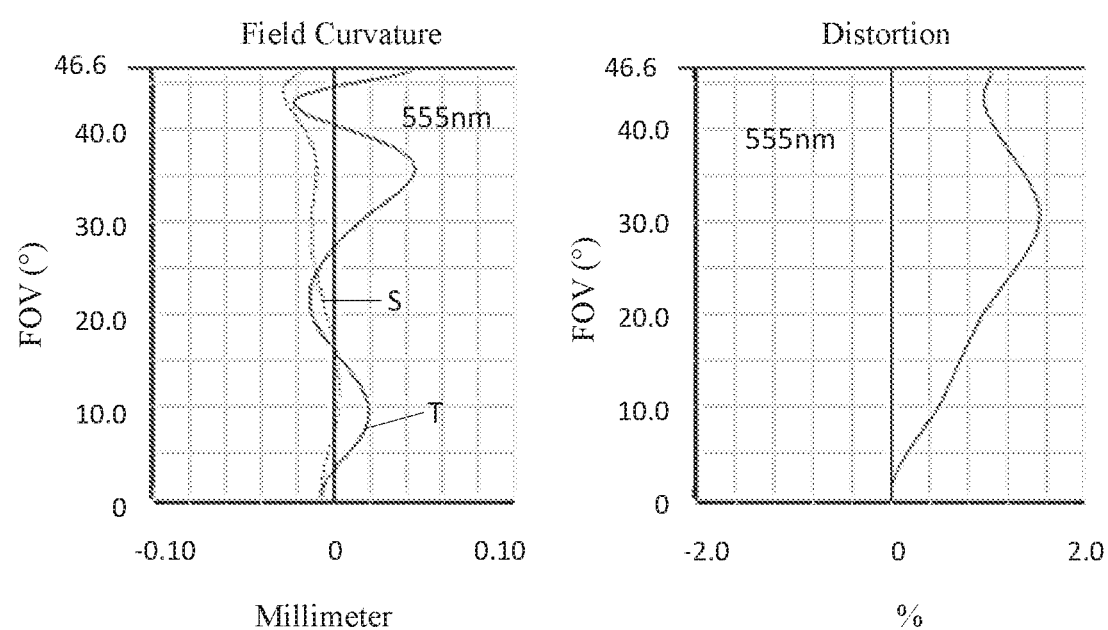
FIG. 4 is a schematic diagram of a field curvature and a distortion of the camera optical lens shown in FIG. 1.
Figure 5:
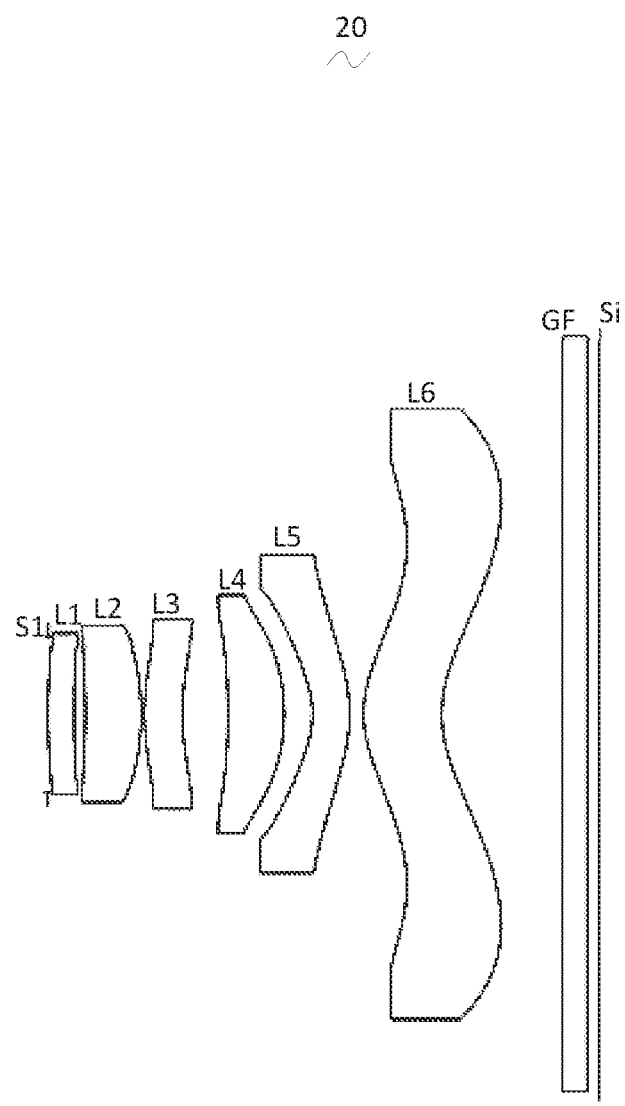
FIG. 5 is a schematic diagram of a structure of a camera optical lens in accordance with Embodiment 2 of the present disclosure.

FIG. 2 and FIG. 3 illustrate a longitudinal aberration and a lateral color of light with wavelengths of 470 nm, 555 nm and 650 nm after passing the camera optical lens 10 according to Embodiment 1. FIG. 4 illustrates a field curvature and a distortion of light with a wavelength of 555 nm after passing the camera optical lens 10 according to Embodiment 1, in which a field curvature S is a field curvature in a sagittal direction and T is a field curvature in a tangential direction.

Table 13 shows various values of Embodiments 1, 2 and 3 and values corresponding to parameters which are specified in the above conditions.

As shown in Table 13, Embodiment 1 satisfies the above conditions.

In this embodiment, the entrance pupil diameter of the camera optical lens is 1.463 mm. The image height of 1.0 H is 3.284. The FOV (field of view) is 93.14°. Thus, the camera optical lens has a wide-angle and is ultra-thin. Its on-axis and off-axis chromatic aberrations are fully corrected, thereby achieving excellent optical characteristics.

Embodiment 2

Embodiment 2 is basically the same as Embodiment 1 and involves symbols having the same meanings as Embodiment 1, and only differences therebetween will be described in the following.

Table 5 and Table 6 show design data of a camera optical lens 20 in Embodiment 2 of the present disclosure.

TABLE 5

| | R | d | | nd | | vd | |
|---|---|---|---|---|---|---|---|
| S1 | ∞ | d0 = | 0.000 | | | | |
| R1 | 6.006 | d1 = | 0.220 | nd1 | 1.5445 | v1 | 55.99 |
| R2 | 20.233 | d2 = | 0.098 | | | | |

TABLE 5-continued

| R | d | nd | vd |
|---|---|---|---|
| R3 | −4.738 | d3 = 0.474 | nd2 | 1.5445 | v2 | 55.99 |
| R4 | −2.389 | d4 = 0.030 | | | | |
| R5 | 2.029 | d5 = 0.323 | nd3 | 1.6613 | v3 | 20.37 |
| R6 | 2.114 | d6 = 0.389 | | | | |
| R7 | −6.197 | d7 = 0.480 | nd4 | 1.5352 | v4 | 56.09 |
| R8 | −1.654 | d8 = 0.241 | | | | |
| R9 | −0.744 | d9 = 0.319 | nd5 | 1.6713 | v5 | 19.24 |
| R10 | −1.244 | d10 = 0.119 | | | | |
| R11 | 0.934 | d11 = 0.665 | nd6 | 1.5352 | v6 | 56.09 |
| R12 | 1.022 | d12 = 1.031 | | | | |
| R13 | ∞ | d13 = 0.210 | ndg | 1.5168 | vg | 64.17 |
| R14 | ∞ | d14 = 0.100 | | | | |

Table 6 shows aspherical surface data of each lens of the camera optical lens 20 in Embodiment 2 of the present disclosure.

TABLE 6

| | Conic coefficient | Aspherical surface coefficients | | | | | | |
|---|---|---|---|---|---|---|---|---|
| | k | A4 | A6 | A8 | A10 | A12 | A14 | A16 |
| R1 | 4.2945E−01 | −4.4332E−02 | 1.2184E−01 | −1.8164E−01 | −2.3447E−01 | 2.5231E−01 | 2.9261E−01 | 7.9685E−02 |
| R2 | 0.0000E+00 | 1.0263E−01 | 8.4413E−02 | −1.1534E−02 | −3.7043E−01 | −1.1526E−01 | 5.8900E−02 | 2.4656E−02 |
| R3 | −9.9981E−02 | 1.4759E−01 | −2.7278E−02 | −1.2170E−01 | −1.3166E−01 | −1.7395E−02 | −1.2049E−01 | −4.4148E−01 |
| R4 | −2.1090E−02 | −1.1219E−01 | 1.7532E−01 | −4.5372E−01 | 4.4403E−01 | −1.2696E−01 | −4.7381E−01 | 4.6229E−01 |
| R5 | −8.0062E+00 | −7.9092E−02 | −1.0754E−01 | 1.4251E−01 | −2.8827E−01 | −1.3410E−01 | 3.6657E−01 | −1.5154E−01 |
| R6 | −4.0441E+00 | −6.8885E−02 | −1.1356E−01 | 2.6943E−02 | −1.5410E−01 | 2.7870E−01 | −3.7609E−01 | 1.9924E−01 |
| R7 | 0.0000E+00 | −9.1115E−02 | 9.0956E−02 | 1.3603E−02 | −4.5930E−02 | −2.0649E−02 | 4.4145E−02 | 1.1078E−02 |
| R8 | 8.8493E−01 | −6.4711E−02 | 7.6904E−02 | 2.0691E−02 | −8.7582E−03 | 2.4274E−03 | −3.0523E−03 | 2.8261E−02 |
| R9 | −4.7356E+00 | 5.4436E−03 | −1.1889E−02 | −1.3737E−02 | −3.8189E−03 | −1.3106E−03 | 6.9109E−03 | −8.2636E−03 |
| R10 | −6.6759E+00 | 3.3032E−02 | −4.1299E−03 | 3.1817E−04 | −1.0746E−03 | −1.9419E−04 | 1.6850E−04 | 9.2124E−05 |
| R11 | −3.8737E+00 | −5.9165E−02 | 3.8376E−03 | 2.2853E−04 | 1.7395E−05 | 2.6874E−06 | −1.9029E−07 | −1.0304E−07 |
| R12 | −3.2838E+00 | −4.1961E−02 | 5.2471E−03 | −5.3895E−04 | 1.3406E−05 | 7.7727E−07 | 1.9953E−09 | −9.3325E−10 |

Table 7 and table 8 show design data of inflexion points and arrest points of respective lens in the camera optical lens 20 according to Embodiment 2 of the present disclosure.

TABLE 7

| | Number of inflexion points | Inflexion point position 1 | Inflexion point position 2 |
|---|---|---|---|
| P1R1 | 1 | 0.565 | |
| P1R2 | 1 | 0.635 | |
| P2R1 | 2 | 0.385 | 0.515 |
| P2R2 | 0 | | |
| P3R1 | 1 | 0.455 | |
| P3R2 | 1 | 0.485 | |
| P4R1 | 1 | 0.775 | |
| P4R2 | 1 | 0.865 | |
| P5R1 | 0 | | |
| P5R2 | 1 | 0.715 | |
| P6R1 | 2 | 0.665 | 1.985 |
| P6R2 | 1 | 0.805 | |

TABLE 8

| | Number of arrest points | Arrest point position 1 |
|---|---|---|
| P1R1 | 0 | |
| P1R2 | 0 | |
| P2R1 | 0 | |
| P2R2 | 0 | |
| P3R1 | 1 | 0.715 |
| P3R2 | 1 | 0.745 |
| P4R1 | 0 | |
| P4R2 | 0 | |

TABLE 8-continued

| | Number of arrest points | Arrest point position 1 |
|---|---|---|
| P5R1 | 0 | |
| P5R2 | 0 | |
| P6R1 | 1 | 1.465 |
| P6R2 | 1 | 1.805 |

Figure 6:
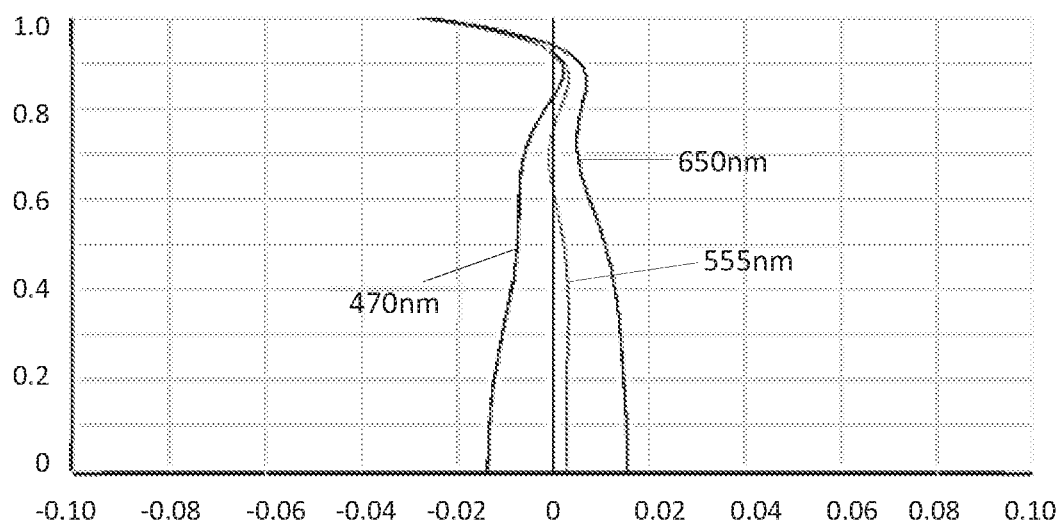
FIG. 6 is a schematic diagram of a longitudinal aberration of the camera optical lens shown in FIG. 5.
Figure 7:
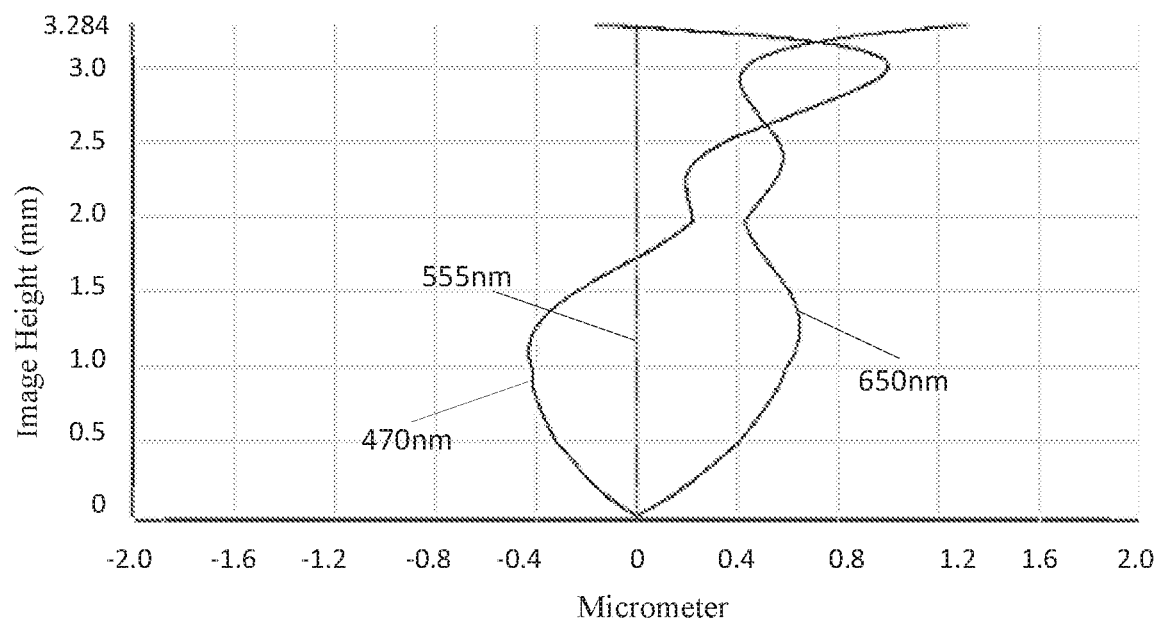
FIG. 7 is a schematic diagram of a lateral color of the camera optical lens shown in FIG. 5.
Figure 8:
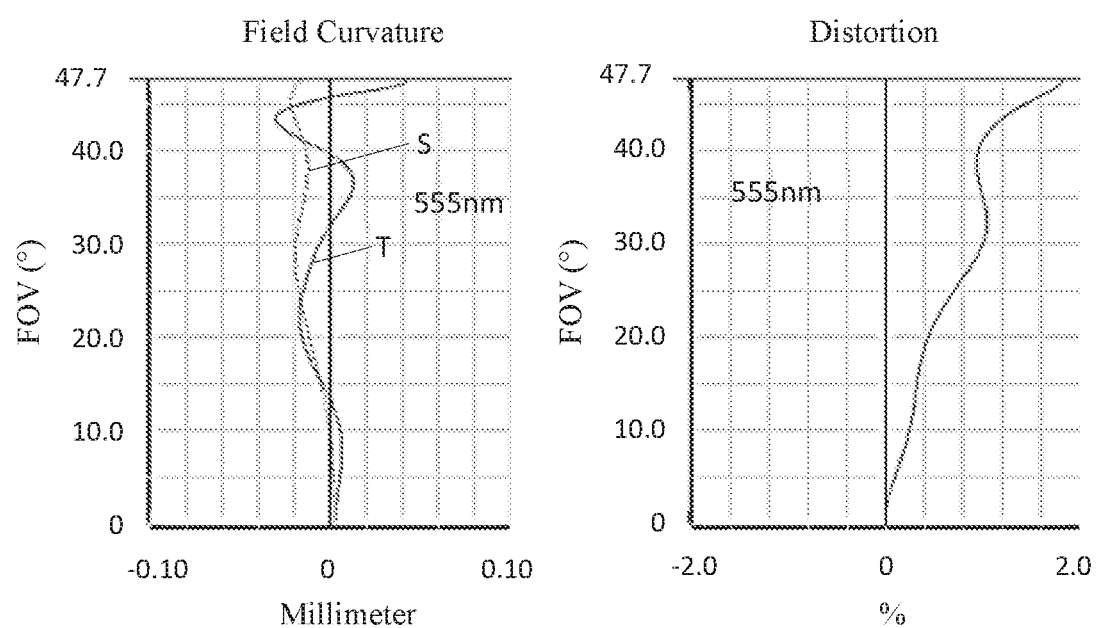
FIG. 8 is a schematic diagram of a field curvature and a distortion of the camera optical lens shown in FIG. 5.
Figure 9:
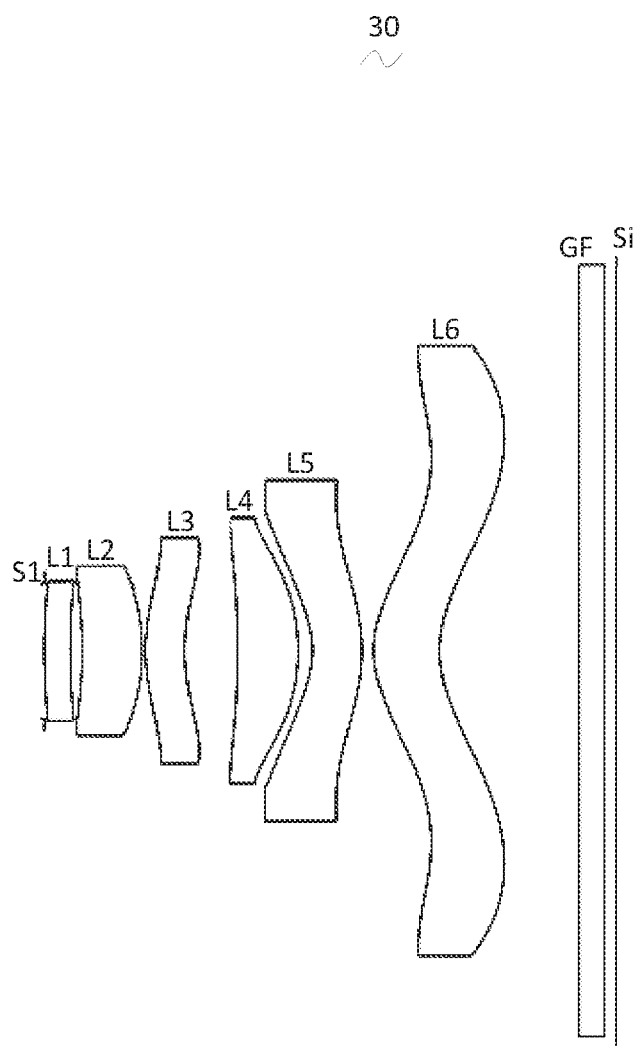
FIG. 9 is a schematic diagram of a structure of a camera optical lens in accordance with Embodiment 3 of the present disclosure.

FIG. 6 and FIG. 7 illustrate a longitudinal aberration and a lateral color of light with wavelengths of 470 nm, 555 nm and 650 nm after passing the camera optical lens 20 according to Embodiment 2. FIG. 8 illustrates a field curvature and a distortion of light with a wavelength of 555 nm after passing the camera optical lens 20 according to Embodiment 2.

As shown in Table 13, Embodiment 2 satisfies the above conditions.

In this embodiment, the entrance pupil diameter of the camera optical lens is 1.334 mm. The image height of 1.0 H is 3.284. The FOV (field of view) is 95.45°. Thus, the camera optical lens has a wide-angle and is ultra-thin. Its on-axis and off-axis chromatic aberrations are fully corrected, thereby achieving excellent optical characteristics.

Embodiment 3

Embodiment 3 is basically the same as Embodiment 1 and involves symbols having the same meanings as Embodiment 1, and only differences therebetween will be described in the following.

Table 9 and Table 10 show design data of a camera optical lens 30 in Embodiment 3 of the present disclosure.

TABLE 9

| | R | d | nd | vd |
|---|---|---|---|---|
| S1 | ∞ | d0 = 0.000 | | | | |
| R1 | 5.597 | d1 = 0.220 | nd1 | 1.5445 | v1 | 55.99 |
| R2 | 9.127 | d2 = 0.103 | | | | |
| R3 | −2.787 | d3 = 0.507 | nd2 | 1.5445 | v2 | 55.99 |
| R4 | −1.791 | d4 = 0.030 | | | | |
| R5 | 1.559 | d5 = 0.333 | nd3 | 1.6150 | v3 | 25.92 |
| R6 | 1.678 | d6 = 0.448 | | | | |
| R7 | −8.860 | d7 = 0.512 | nd4 | 1.5352 | v4 | 56.09 |
| R8 | −1.624 | d8 = 0.126 | | | | |
| R9 | −0.741 | d9 = 0.418 | nd5 | 1.6713 | v5 | 19.24 |
| R10 | −1.371 | d10 = 0.100 | | | | |
| R11 | 0.851 | d11 = 0.560 | nd6 | 1.5352 | v6 | 56.09 |
| R12 | 0.972 | d12 = 1.185 | | | | |

TABLE 9-continued

| | R | d | | nd | | vd |
|---|---|---|---|---|---|---|
| R13 | ∞ | d13 = | 0.210 | ndg | 1.5168 | vg | 64.17 |
| R14 | ∞ | d14 = | 0.100 | | | |

Table 10 shows aspherical surface data of each lens of the camera optical lens 30 in Embodiment 3 of the present disclosure.

TABLE 10

| | Conic coefficient | Aspherical surface coefficients | | | | | | |
|---|---|---|---|---|---|---|---|---|
| | k | A4 | A6 | A8 | A10 | A12 | A14 | A16 |
| R1 | 0.0000E+00 | 1.5635E−03 | −1.4699E−02 | −8.1147E−01 | 6.6669E−01 | 3.5297E+00 | −1.0383E+01 | 1.2910E+01 |
| R2 | 0.0000E+00 | 1.9269E−01 | −1.2632E−01 | −1.0850E+00 | 1.3574E−01 | 1.3985E+00 | 1.0036E+00 | 1.6328E+01 |
| R3 | −1.3636E+01 | 2.0301E−01 | −4.1491E−01 | 2.1147E−02 | 1.0258E+00 | −2.4802E+00 | −2.0382E+01 | 6.7472E+01 |
| R4 | −1.7693E−01 | −1.0032E−01 | 1.1798E−01 | −2.4106E−01 | 6.6393E−01 | −6.3096E−01 | −9.0177E−01 | 2.5258E+00 |
| R5 | −6.7074E+00 | −5.7161E−02 | −1.1036E−01 | 1.5040E−01 | −1.3649E−01 | −4.3000E−02 | 2.1786E−01 | −1.0663E−01 |
| R6 | −2.9442E+00 | −6.4132E−02 | −1.2263E−01 | 5.4798E−02 | −9.7592E−02 | 2.9217E−01 | −4.0987E−01 | 1.8435E−01 |
| R7 | 0.0000E+00 | −7.2905E−02 | 9.0602E−02 | 1.6804E−02 | −4.6615E−02 | −2.4941E−02 | 3.6015E−02 | −4.5834E−03 |
| R8 | 8.3003E−01 | −5.8180E−02 | 1.0003E−01 | 2.3715E−02 | −1.0028E−02 | −5.2081E−05 | −7.7443E−03 | 1.7335E−02 |
| R9 | −4.4830E+00 | 3.1456E−02 | 6.7329E−03 | −5.1697E−03 | −4.3744E−03 | −4.3744E−03 | 6.3948E−03 | −2.2702E−03 |
| R10 | −6.6280E+00 | 4.8547E−02 | −1.9786E−05 | 1.4367E−03 | −7.6209E−04 | −2.0085E−04 | 6.5570E−05 | −5.1749E−06 |
| R11 | −2.7825E+00 | −6.2913E−02 | 4.8102E−03 | 2.0333E−04 | −1.4871E−06 | 4.7918E−07 | −1.8461E−07 | −2.1825E−08 |
| R12 | −2.4355E+00 | −5.9007E−02 | 7.5106E−03 | −5.0853E−04 | 3.9490E−06 | −4.8066E−07 | −1.7390E−08 | 1.9424E−08 |

Table 11 and table 12 show design data of inflexion points and arrest points of respective lens in the camera optical lens 30 according to Embodiment 3 of the present disclosure.

TABLE 11

| | Number of inflexion points | Inflexion point position 1 | Inflexion point position 2 |
|---|---|---|---|
| P1R1 | 1 | 0.435 | |
| P1R2 | 0 | | |
| P2R1 | 1 | 0.535 | |
| P2R2 | 1 | 0.675 | |
| P3R1 | 1 | 0.515 | |
| P3R2 | 1 | 0.535 | |
| P4R1 | 1 | 0.745 | |
| P4R2 | 1 | 0.885 | |
| P5R1 | 2 | 0.695 | 0.915 |
| P5R2 | 1 | 0.625 | |
| P6R1 | 2 | 0.715 | 2.065 |
| P6R2 | 1 | 0.805 | |

TABLE 12

| | Number of arrest points | Arrest point position 1 |
|---|---|---|
| P1R1 | 0 | |
| P1R2 | 0 | |
| P2R1 | 0 | |
| P2R2 | 0 | |
| P3R1 | 0 | |
| P3R2 | 1 | 0.845 |
| P4R1 | 0 | |
| P4R2 | 0 | |
| P5R1 | 0 | |
| P5R2 | 1 | 1.275 |
| P6R1 | 1 | 1.615 |
| P6R2 | 1 | 1.795 |

Figure 10:
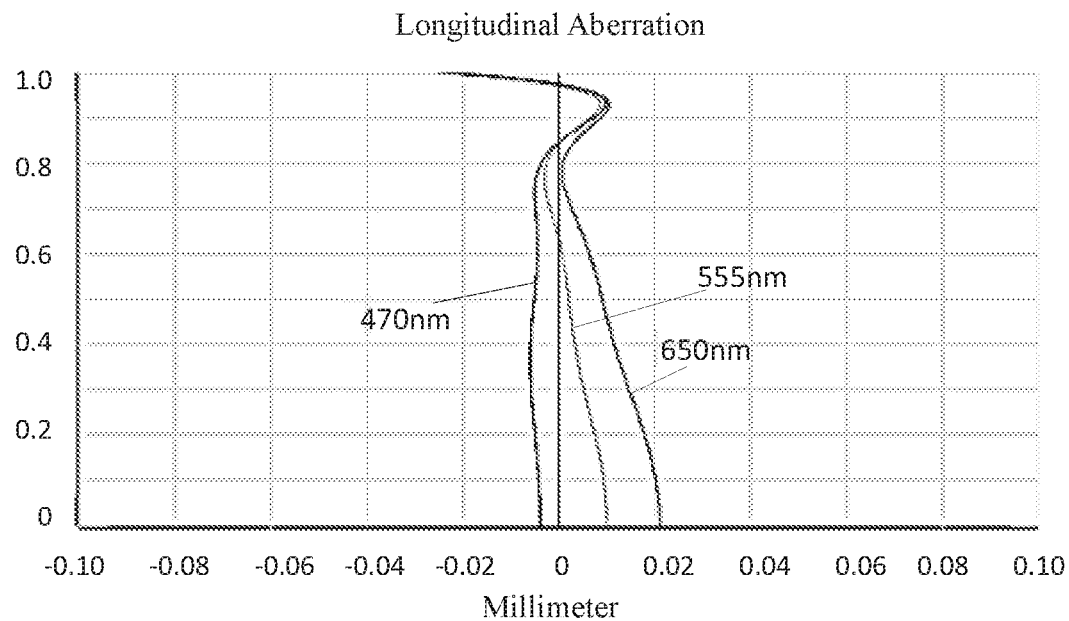
FIG. 10 is a schematic diagram of a longitudinal aberration of the camera optical lens shown in FIG. 9.
Figure 11:
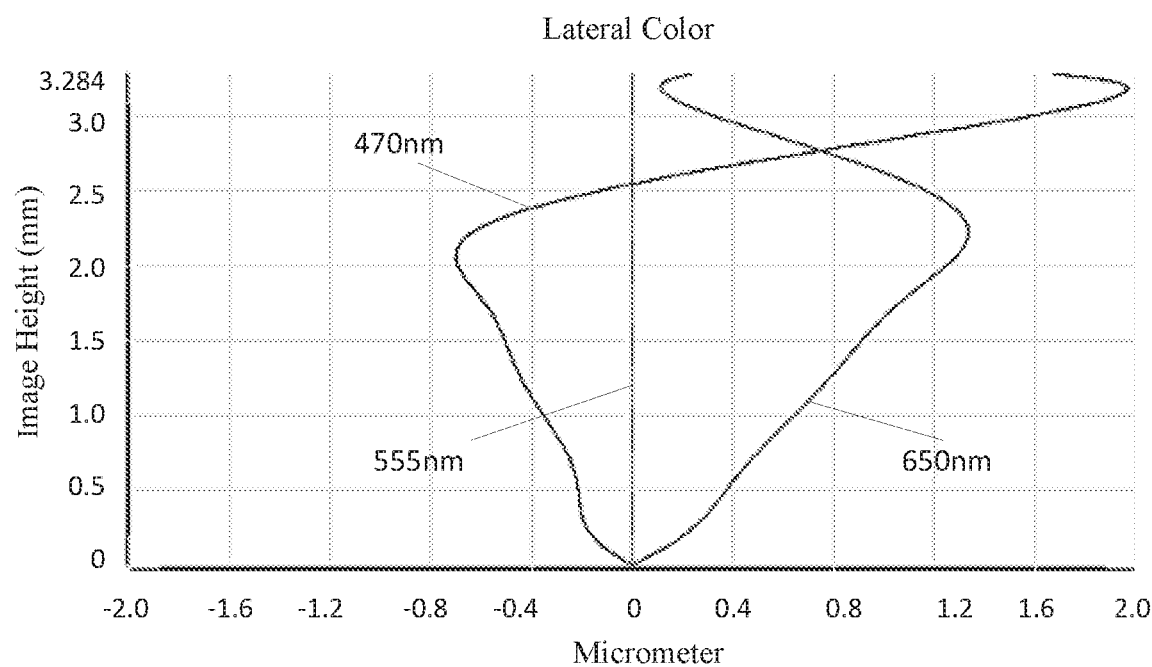
FIG. 11 is a schematic diagram of a lateral color of the camera optical lens shown in FIG. 9.
Figure 12:
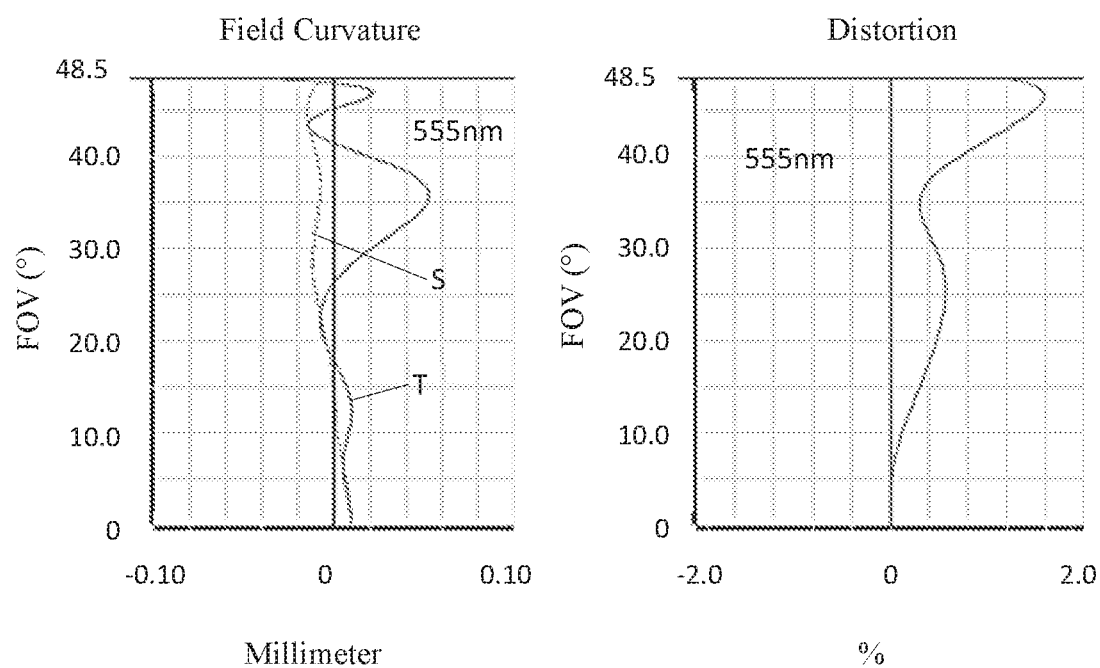
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 470 nm, 555 nm and 650 nm after passing the camera optical lens 30 according to Embodiment 3. FIG. 12 illustrates field curvature and distortion of light with a wavelength of 555 nm after passing the camera optical lens 30 according to Embodiment 3.

Table 13 in the following lists values corresponding to the respective conditions in this embodiment in order to satisfy the above conditions. The camera optical lens according to this embodiment satisfies the above conditions.

In this embodiment, the entrance pupil diameter of the camera optical lens is 1.138 mm. The image height of 1.0 H is 3.284 mm. The FOV (field of view) is 96.93°. Thus, the camera optical lens has a wide-angle and is ultra-thin. Its on-axis and off-axis chromatic aberrations are fully corrected, thereby achieving excellent optical characteristics.

TABLE 13

| Parameters and conditions | Embodiment 1 | Embodiment 2 | Embodiment 3 |
|---|---|---|---|
| f | 3.072 | 2.934 | 2.880 |
| f1 | 9.304 | 15.552 | 25.922 |
| f2 | 10.107 | 8.232 | 7.778 |
| f3 | 300.616 | 30.019 | 17.155 |
| f4 | 4.431 | 4.054 | 3.615 |
| f5 | −3.751 | −3.680 | −3.250 |
| f6 | 5.332 | 5.552 | 4.860 |
| f12 | 5.006 | 5.589 | 6.212 |
| Fno | 2.10 | 2.20 | 2.53 |
| f1/f | 3.03 | 5.30 | 9.00 |
| R3/d3 | −19.91 | −10.00 | −5.50 |

It can be appreciated by one having ordinary skill in the art that the description above is only embodiments of the present disclosure. In practice, one having ordinary skill in the art can make various modifications to these embodiments in forms and details without departing from the spirit and scope of the present disclosure.

What is claimed is:

1. A camera optical lens, comprising, from an object side to an image side:
   a first lens;
   a second lens having a positive refractive power ;
   a third lens having a positive refractive power;
   a fourth lens;
   a fifth lens; and
   a sixth lens,
   wherein the camera optical lens satisfies following conditions:

$3.00 \leq f1/f \leq 10.00$; and $-20.00 \leq R3/d3 \leq -5.00$, where
f denotes a focal length of the camera optical lens;
f1 denotes a focal length of the first lens;
R3 denotes a curvature radius of an object side surface of the second lens; and
d3 denotes an on-axis thickness of the second lens.

2. The camera optical lens as described in claim 1, further satisfying following conditions:

$3.01 \leq f1/f \leq 9.50$; and $-19.95 \leq R3/d3 \leq -5.25$.

3. The camera optical lens as described in claim 1, wherein the first lens has a positive refractive power, and comprises an object side surface being convex in a paraxial region, and the camera optical lens further satisfies following conditions:

$-8.34 \leq (R1+R2)/(R1-R2) \leq -0.59$; and $0.02 \leq d1/TTL \leq 0.08$, where
R1 denotes a curvature radius of the object side surface of the first lens;
R2 denotes a curvature radius of an image side surface of the first lens;
d1 denotes an on-axis thickness of the first lens; and
TTL denotes a total optical length from the object side surface of the first lens to an image plane of the camera optical lens along an optic axis.

4. The camera optical lens as described in claim 3, further satisfying following conditions:

$-5.21 \leq (R1+R2)/(R1-R2) \leq -0.73$; and $0.04 \leq d1/TTL \leq 0.06$.

5. The camera optical lens as described in claim 1, wherein the object side surface of the second lens is concave in a paraxial region, and an image side surface of the second lens is convex in the paraxial region, and
the camera optical lens further satisfies following conditions:

$1.35 \leq f2/f \leq 4.94$;

$1.35 \leq (R3+R4)/(R3-R4) \leq 6.90$; and $0.04 \leq d3/TTL \leq 0.16$, where
f2 denotes a focal length of the second lens;
R4 denotes a curvature radius of the image side surface of the second lens; and
TTL denotes a total optical length from an object side surface of the first lens to an image plane of the camera optical lens along an optic axis.

6. The camera optical lens as described in claim 5, further satisfying following conditions:

$2.16 \leq f2/f \leq 3.95$;

$2.16 \leq (R3+R4)/(R3-R4) \leq 5.52$; and $0.06 \leq d3/TTL \leq 0.13$.

7. The camera optical lens as described in claim 1, wherein the third lens comprises an object side surface being convex in a paraxial region and an image side surface being concave in the paraxial region, and
the camera optical lens further satisfies following conditions:

$2.98 \leq f3/f \leq 146.81$;

$-97.46 \leq (R5+R6)/(R5-R6) \leq 75.48$; and $0.03 \leq d5/TTL \leq 0.10$, where
f3 denotes a focal length of the third lens;
R5 denotes a curvature radius of the object side surface of the third lens;
R6 denotes a curvature radius of the image side surface of the third lens;
d5 denotes an on-axis thickness of the third lens; and
TTL denotes a total optical length from an object side surface of the first lens to an image plane of the camera optical lens along an optic axis.

8. The camera optical lens as described in claim 7, further satisfying following conditions:

$4.76 \leq f3/f \leq 117.45$;

$-60.91 \leq (R5+R6)/(R5-R6) \leq 60.39$; and $0.05 \leq d5/TTL \leq 0.08$.

9. The camera optical lens as described in claim 1, wherein the fourth lens has a positive refractive power, and comprises an object side surface being concave in a paraxial region and an image side surface being convex in the paraxial region, and
the camera optical lens further satisfies following conditions:

$0.63 \leq f4/f \leq 2.16$;

$0.72 \leq (R7+R8)/(R7-R8) \leq 2.88$; and $0.05 \leq d7/TTL \leq 0.16$, where
f4 denotes a focal length of the fourth lens;
R7 denotes a curvature radius of the object side surface of the fourth lens;
R8 denotes a curvature radius of the image side surface of the fourth lens;
d7 denotes an on-axis thickness of the fourth lens; and
TTL denotes a total optical length from an object side surface of the first lens to an image plane of the camera optical lens along an optic axis.

10. The camera optical lens as described in claim 9, further satisfying following conditions:

$1.00 \leq f4/f \leq 1.73$;

$1.16 \leq (R7+R8)/(R7-R8) \leq 2.30$; and $0.08 \leq d7/TTL \leq 0.13$.

11. The camera optical lens as described in claim 1, wherein the fifth lens has a negative refractive power, and comprises an object side surface being concave in a paraxial region and an image side surface being convex in the paraxial region, and
the camera optical lens further satisfies following conditions:

$-2.51 \leq f5/f \leq -0.75$;

$-7.95 \leq (R9+R10)/(R9-R10) \leq -2.23$; and $0.03 \leq d9/TTL \leq 0.13$, where
f5 denotes a focal length of the fifth lens;
R9 denotes a curvature radius of the object side surface of the fifth lens;

R10 denotes a curvature radius of the image side surface of the fifth lens;

d9 denotes an on-axis thickness of the fifth lens; and

TTL denotes a total optical length from an object side surface of the first lens to an image plane of the camera optical lens along an optic axis.

12. The camera optical lens as described in claim 11, further satisfying following conditions:

$$-1.57 \leq f5/f \leq -0.94;$$

$$-4.97 \leq (R9+R10)/(R9-R10) \leq -2.79; \text{ and}$$

$$0.05 \leq d9/TTL \leq 0.10.$$

13. The camera optical lens as described in claim 1, wherein the sixth lens has a positive refractive power, and comprises an object side surface being convex in a paraxial region and an image side surface being concave in the paraxial region, and the camera optical lens further satisfies following conditions:

$$0.84 \leq f6/f \leq 2.84;$$

$$-47.90 \leq (R11+R12)/(R11-R12) \leq -10.02; \text{ and}$$

$$0.06 \leq d11/TTL \leq 0.23,$$

where f6 denotes a focal length of the sixth lens;

R11 denotes a curvature radius of the object side surface of the sixth lens;

R12 denotes a curvature radius of the image side surface of the sixth lens;

d11 denotes an on-axis thickness of the sixth lens; and

TTL denotes a total optical length from an object side surface of the first lens to an image plane of the camera optical lens along an optic axis.

14. The camera optical lens as described in claim 13, further satisfying following conditions:

$$1.35 \leq f6/f \leq 2.27;$$

$$-29.94 \leq (R11+R12)/(R11-R12) \leq -12.52; \text{ and}$$

$$0.09 \leq d11/TTL \leq 0.19.$$

15. The camera optical lens as described in claim 1, further satisfying a following condition:

$$0.81 \leq f12/f \leq 3.24,$$

where f12 denotes a combined focal length of the first lens and the second lens.

16. The camera optical lens as described in claim 15, further satisfying a following condition:

$$1.30 \leq f12/f \leq 2.59.$$

17. The camera optical lens as described in claim 1, wherein a total optical length TTL from an object side surface of the first lens to an image plane of the camera optical lens along an optic axis is smaller than or equal to 5.34 mm.

18. The camera optical lens as described in claim 17, wherein the total optical length TTL of the camera optical lens is smaller than or equal to 5.09 mm.

19. The camera optical lens as described in claim 1, wherein an F number of the camera optical lens is smaller than or equal to 2.61.

20. The camera optical lens as described in claim 19, wherein the F number of the camera optical lens is smaller than or equal to 2.56.

* * * * *